US012586960B2

(12) United States Patent
Noguchi et al.

(10) Patent No.: US 12,586,960 B2
(45) Date of Patent: Mar. 24, 2026

(54) TERMINAL UNIT, AND CONNECTOR INCLUDING THE SAME

(71) Applicant: IRISO ELECTRONICS CO., LTD., Yokohama (JP)

(72) Inventors: Daisuke Noguchi, Yokohama (JP); Takayuki Arai, Yokohama (JP); Hiroaki Yukutake, Yokohama (JP); Yoshihito Okuma, Yokohama (JP)

(73) Assignee: IRISO ELECTRONICS CO., LTD., Yokohama (JP)

( * ) Notice: Subject to any disclaimer, the term of this patent is extended or adjusted under 35 U.S.C. 154(b) by 367 days.

(21) Appl. No.: 18/331,226

(22) Filed: Jun. 8, 2023

(65) Prior Publication Data

US 2023/0402800 A1 Dec. 14, 2023

(30) Foreign Application Priority Data

Jun. 10, 2022 (JP) ................................ 2022-094275

(51) Int. Cl.
*H01R 13/6592* (2011.01)
*H01R 4/18* (2006.01)

(52) U.S. Cl.
CPC ......... *H01R 13/6592* (2013.01); *H01R 4/184* (2013.01)

(58) Field of Classification Search
CPC .............................. H01R 13/6592; H01R 4/84
USPC ....................................................... 439/607.5
See application file for complete search history.

(56) References Cited

U.S. PATENT DOCUMENTS

| | | | | |
|---|---|---|---|---|
| 6,709,290 B2 * | 3/2004 | Yoshida | H01R 24/44 | 439/585 |
| 2003/0224656 A1 * | 12/2003 | Yoshida | H01R 13/4361 | 439/578 |
| 2010/0035449 A1 * | 2/2010 | Nagafuchi | H01R 4/18 | 439/98 |
| 2013/0288523 A1 * | 10/2013 | Ii | H01R 13/6581 | 439/607.01 |
| 2019/0173243 A1 | 6/2019 | Annequin | | |
| 2019/0288456 A1 * | 9/2019 | Maesoba | H01R 13/424 | |

(Continued)

FOREIGN PATENT DOCUMENTS

| | | | |
|---|---|---|---|
| CN | 101772864 A * | 7/2010 | H01R 13/6592 |
| JP | 2003317882 A * | 11/2003 | |

(Continued)

OTHER PUBLICATIONS

Japanese Office Action for corresponding Japanese Office Action JP 2022-094275, dated Jan. 13, 2026, 6 pages.

*Primary Examiner* — Peter G Leigh
(74) *Attorney, Agent, or Firm* — Westman, Champlin & Koehler, P.A.

(57) ABSTRACT

A terminal unit includes one or more internal terminal, a dielectric member, and an external terminal. The internal terminal includes a contact portion for contacting a connection target (counterpart side connector), and a press-fit portion for press-fitting together with an inner conductor. The contact portion is provided at an axial direction one side, and the press-fit portion is provided at an axial direction other side. The internal terminal further includes an impedance adjustment section connected to a press-fit portion. The impedance adjustment section projects out to the axial direction other side with respect to the press-fit portion.

11 Claims, 9 Drawing Sheets

(56) References Cited

U.S. PATENT DOCUMENTS

| | | | | |
|---|---|---|---|---|
| 2021/0090763 | A1 | 3/2021 | Oomori et al. | |
| 2022/0368039 | A1 | 11/2022 | De Cloet et al. | |
| 2023/0046729 | A1 * | 2/2023 | Maesoba | H01R 13/428 |

FOREIGN PATENT DOCUMENTS

| | | | | | |
|---|---|---|---|---|---|
| JP | 2008-181810 | A | | 8/2008 | |
| JP | 2010049859 | A | * | 3/2010 | |
| JP | 2011009111 | A | * | 1/2011 | |
| JP | 2011124136 | A | * | 6/2011 | H01R 13/6473 |
| JP | 2013157080 | A | | 8/2013 | |
| JP | 2018063794 | A | * | 4/2018 | H01R 13/187 |
| JP | 202157345 | A | | 4/2021 | |
| JP | 2021051846 | A | | 4/2021 | |
| JP | 2022176124 | A | | 11/2022 | |
| WO | WO-2012008522 | A1 | * | 1/2012 | H01R 24/50 |
| WO | WO-2021145195 | A1 | * | 7/2021 | H01R 13/424 |
| WO | WO-2021145196 | A1 | * | 7/2021 | H01R 13/6593 |

* cited by examiner

TERMINAL UNIT, AND CONNECTOR INCLUDING THE SAME

CROSS-REFERENCE TO RELATED APPLICATION

This application claims priority under 35 USC 119 from Japanese Patent application No. 2022-094275 filed on Jun. 10, 2022, the disclosure of which is incorporated by reference herein in its entirety.

TECHNICAL FIELD

The present disclosure relates to a terminal unit, and a connector including the same.

BACKGROUND ART

Patent Document 1 discloses a terminal unit for mounting to a shield cable. This terminal unit includes an internal terminal for connecting to an inner conductor of the shield cable, a dielectric member that retains the internal terminal, and an outer terminal for connecting to an external conductor of the shield cable and that houses the internal terminal and the dielectric member. The internal terminal includes a press-fit portion that press-fits to the inner conductor at an axial direction other side thereof.

RELATED LITERATURE

Patent Literature

Patent Document 1: Japanese Patent Application Laid-Open (JP-A) No. 2008-181810

SUMMARY OF INVENTION

Technical Problem

In a terminal unit such as described above, a not inconsiderable portion of the inner conductor of the shield cable is exposed from an insulating cover further to an axial direction other side than the position where the press-fit portion is press-fitted. There is a concern regarding an excessive rise in the impedance of such an exposed portion.

An object to be addressed by the present disclosure is to provide a terminal unit having enhanced impedance matching, and a connector including the same.

Solution to Problem

A terminal unit according to a first aspect is a terminal unit for mounting to a shield cable including one or more inner conductor and an external conductor that shields the one or more inner conductor. The terminal unit includes one or more internal terminal for connecting to the one or more inner conductor, a dielectric member that retains the one or more internal terminal, and an external terminal for connecting to the external conductor and that houses the dielectric member. The one or more internal terminal includes an internal terminal including a contact portion provided at an axial direction one side for contacting a connection target, a press-fit portion provided at an axial direction other side for press-fitting together with the inner conductor, and an impedance adjustment section that is connected to the press-fit portion, with the impedance adjustment section projecting out to the axial direction other side with respect to the press-fit portion.

In the present aspect the terminal unit is for mounting to a shield cable. The shield cable includes the one or more inner conductor and the external conductor that shields the one or more inner conductor.

The terminal unit includes the one or more internal terminal for connecting to the one or more inner conductor, the dielectric member that retains the one or more internal terminal, and the external terminal for connecting to the external conductor. The external terminal houses the dielectric member.

The internal terminal includes the contact portion for contacting the connection target and the press-fit portion for press-fitting onto the inner conductor. The contact portion is provided at the axial direction one side, and the press-fit portion is provided at the axial direction other side.

The one or more internal terminal includes the internal terminal further including the impedance adjustment section connected to the press-fit portion. This accordingly enables the capacitance of the press-fit portion to be increased, and the impedance of the press-fit portion to be lowered.

Furthermore, the impedance adjustment section projects out to the axial direction other side with respect to the press-fit portion. This enables impedance to be prevented from rising excessively at a portion of the inner conductor of the shield cable that is further to the axial direction other side than a position where the press-fit portion is press-fitted and that is a portion exposed from an insulating cover (hereafter referred to as an exposed portion of the inner conductor).

Due to the above, the present aspect is able to realize a terminal unit having enhanced impedance matching.

Note that an exemplary embodiment described later describes an example in which the impedance adjustment section is connected to the press-fit portion by being formed as a single body together with the press-fit portion. However, the impedance adjustment section of the present aspect is not limited thereto, and may be formed as a separate body from the press-fit portion, and connected to the press-fit portion by a bonding means (welding, soldering, or other known fitting means).

The exemplary embodiment described later describes an example in which all of the internal terminals contained in the connector include the impedance adjustment section. However, the connector of the present aspect is not limited thereto, and may include an internal terminal without an impedance adjustment section.

A terminal unit according to a second aspect is the first aspect, wherein the impedance adjustment section includes an axial direction extension portion that extends in an axial direction.

In the present aspect, the impedance adjustment section includes the axial direction extension portion extending in the axial direction. This thereby enables the axial direction extension portion to be disposed so as to be along the inner conductor or along an insulating cover covering the inner conductor. A length of the impedance adjustment section can be secured thereby, enabling even more enhanced impedance matching to be achieved.

A terminal unit according to a third aspect is the second aspect wherein the impedance adjustment section further includes a radial direction extension portion extending in a radial direction, with the radial direction extension portion positioned between the press-fit portion and the axial direction extension portion.

In the present aspect, the impedance adjustment section further includes the radial direction extension portion extending in the radial direction. The radial direction extension portion is positioned between the press-fit portion and the axial direction extension portion. This enable the press-fit portion to be brought into close proximity to the insulating cover, and also enables the axial direction extension portion to be disposed so as to be along the insulating cover. As a result thereof even more enhanced impedance matching can be achieved.

A terminal unit according to a fourth aspect is any one of the first to the third aspects, wherein the impedance adjustment section is formed as a single body together with the press-fit portion.

In the present aspect, the impedance adjustment section is formed as a single body together with the press-fit portion. This facilitates manufacture of the internal terminals compared to an embodiment in which the impedance adjustment section is formed as a separate body to the press-fit portion.

The terminal unit according to the fifth aspect is the fourth aspect, wherein the press-fit portion includes a bottom plate portion and a press-fit tab extended from the bottom plate portion, and the impedance adjustment section extends from an end portion at the axial direction other side of the bottom plate portion.

In the present aspect, the impedance adjustment section extends from the end portion at the axial direction other side of the bottom plate portion of the press-fit portion. Manufacture of the internal terminal is accordingly easier than in an embodiment in which the impedance adjustment section extends from a portion other than the end portion on the axial direction other side of the bottom plate portion.

A terminal unit according to a sixth aspect is any one of the first to the fifth aspects, wherein the impedance adjustment section is not a structure surrounding the inner conductor in a circumferential direction.

In the present aspect, the impedance adjustment section is not a structure surrounding the inner conductor in a circumferential direction. This enables the impedance to be prevented from falling excessively compared to an embodiment in which the impedance adjustment section is a structure surrounding the inner conductor in the circumferential direction.

A terminal unit according to seventh aspect is any one of the first to the sixth aspects, wherein the one or more inner conductor is two or more inner conductors, the one or more internal terminal is two or more internal terminals, and two or more of the impedance adjustment sections are not disposed between adjacent two inner conductors from out of the two or more inner conductors.

In the present aspect, the shield cable includes the two or more inner conductors, and the connector includes the two or more internal terminals. The two or more of the impedance adjustment sections are not disposed between adjacent two inner conductors from out of the two or more inner conductors.

For example, there would be a concern regarding an adverse effect being imparted to impedance matching were both of the respective impedance adjustment sections for the two internal terminals connected to the adjacent two inner conductors to be disposed between the two inner conductors. The present aspect is able to prevent this from occurring.

Note that an exemplary embodiment described later describes an embodiment in which two internal terminals connected to two adjacent inner conductors each include the impedance adjustment section, and not one of the impedance adjustment sections is disposed between the adjacent two inner conductors. However, the present aspect is not limited thereto.

For example, the present aspect includes an embodiment in which although two internal terminals connected to two adjacent inner conductors each include the impedance adjustment section, only one of the impedance adjustment sections is disposed between the adjacent two inner conductors.

Moreover, for example, the present aspect includes an embodiment in which one out of two internal terminals connected to two adjacent inner conductors does not include an impedance adjustment section, and as a result two or more impedance adjustment sections are not disposed between the adjacent two inner conductors.

A terminal unit according to an eighth aspect is any one of the first to seventh aspects, wherein the one or more inner conductors is two or more inner conductors, the one or more internal terminal is two or more internal terminals, and the dielectric member includes a partition wall at a position between the impedance adjustment sections for each of adjacent two inner terminals of the two or more inner terminals.

In the present aspect the terminal unit includes two internal terminals. The dielectric member includes a partition wall at a position between the impedance adjustment sections for each of the two internal terminals.

This enables an differential impedance to be lowered more than in an embodiment in which there is no such partition wall.

A terminal unit according to a ninth aspect is any one of the first to the eighth aspects, wherein an end portion on an opposite side of the impedance adjustment section to where the press-fit portion is connected is a carrier severance portion.

In the present aspect, the end portion on the opposite side of the impedance adjustment section to where the press-fit portion is connected is the carrier severance portion.

This enables the internal terminal including the impedance adjustment section to be manufactured by adjusting the position of severing from the carrier in the manufacturing processes of the internal terminal. This facilitates manufacture of the internal terminal.

A terminal unit according to a tenth aspect is any one of the first to ninth aspects, wherein the dielectric member surrounds the impedance adjustment section in a circumferential direction.

In the present aspect, the dielectric member surrounds the impedance adjustment section in the circumferential direction. This enables the impedance of the exposed portion of the inner conductor to be lowered more than in an embodiment in which the dielectric member does not surround the impedance adjustment section in the circumferential direction.

A connector of the eleventh aspect includes plural of the terminal units according to any one of the first to the tenth aspects, and a housing that retains the plural terminal units.

In the present aspect, the connector include the plural terminal units and the housing that retains the plural terminal units. The terminal unit is configured with enhanced impedance matching, thereby enabling a connector having enhanced impedance matching to be obtained.

BRIEF DESCRIPTION OF DRAWINGS

Exemplary embodiments of the present disclosure will be described in detail based on the following figures, wherein.

DESCRIPTION OF EMBODIMENTS

Description follows regarding a terminal unit 14 and a connector 100 according to an exemplary embodiment.

Connector 100

Figure 1:
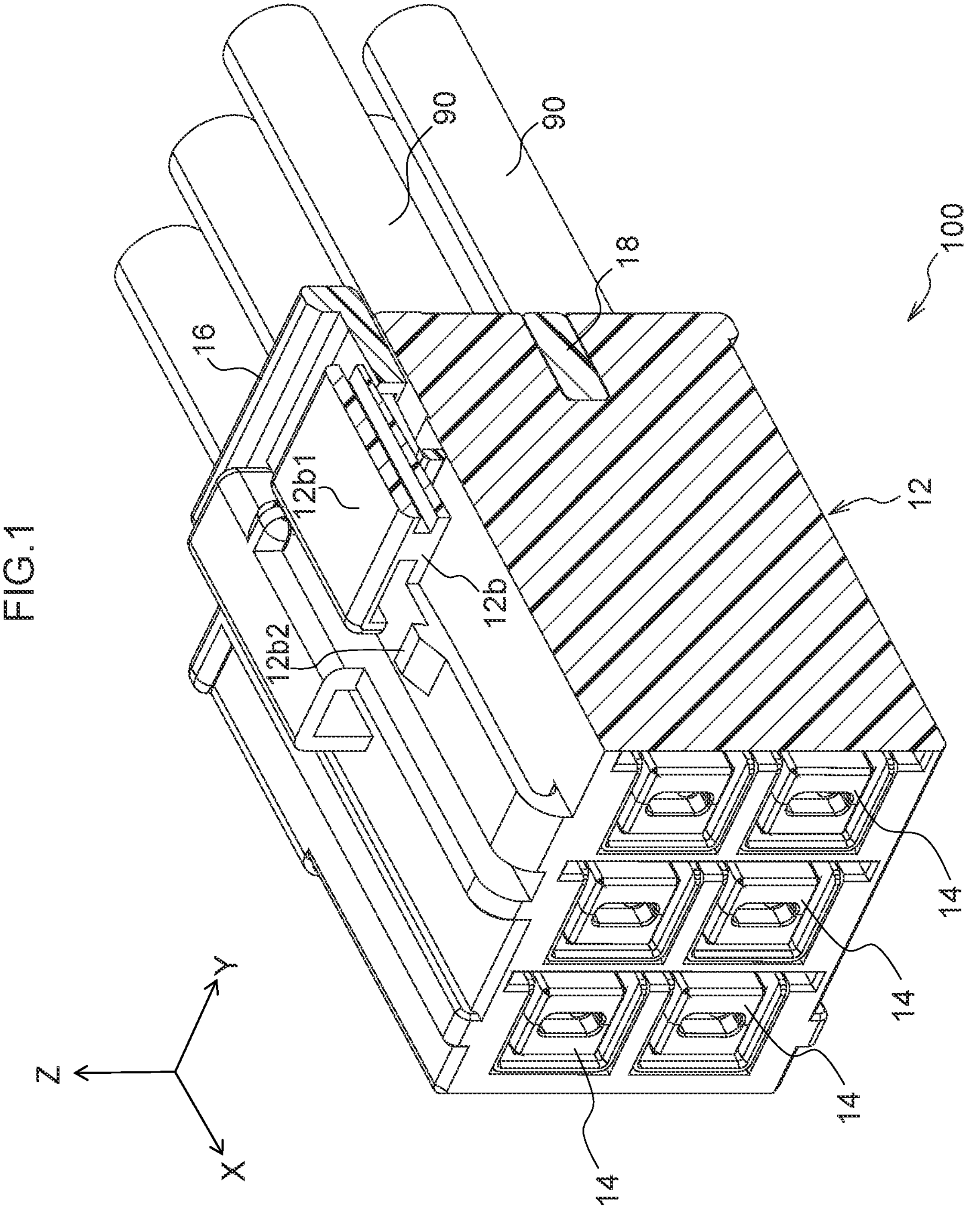
FIG. 1 is a perspective view (cross-section) illustrating a connector of an exemplary embodiment.
Figure 2:
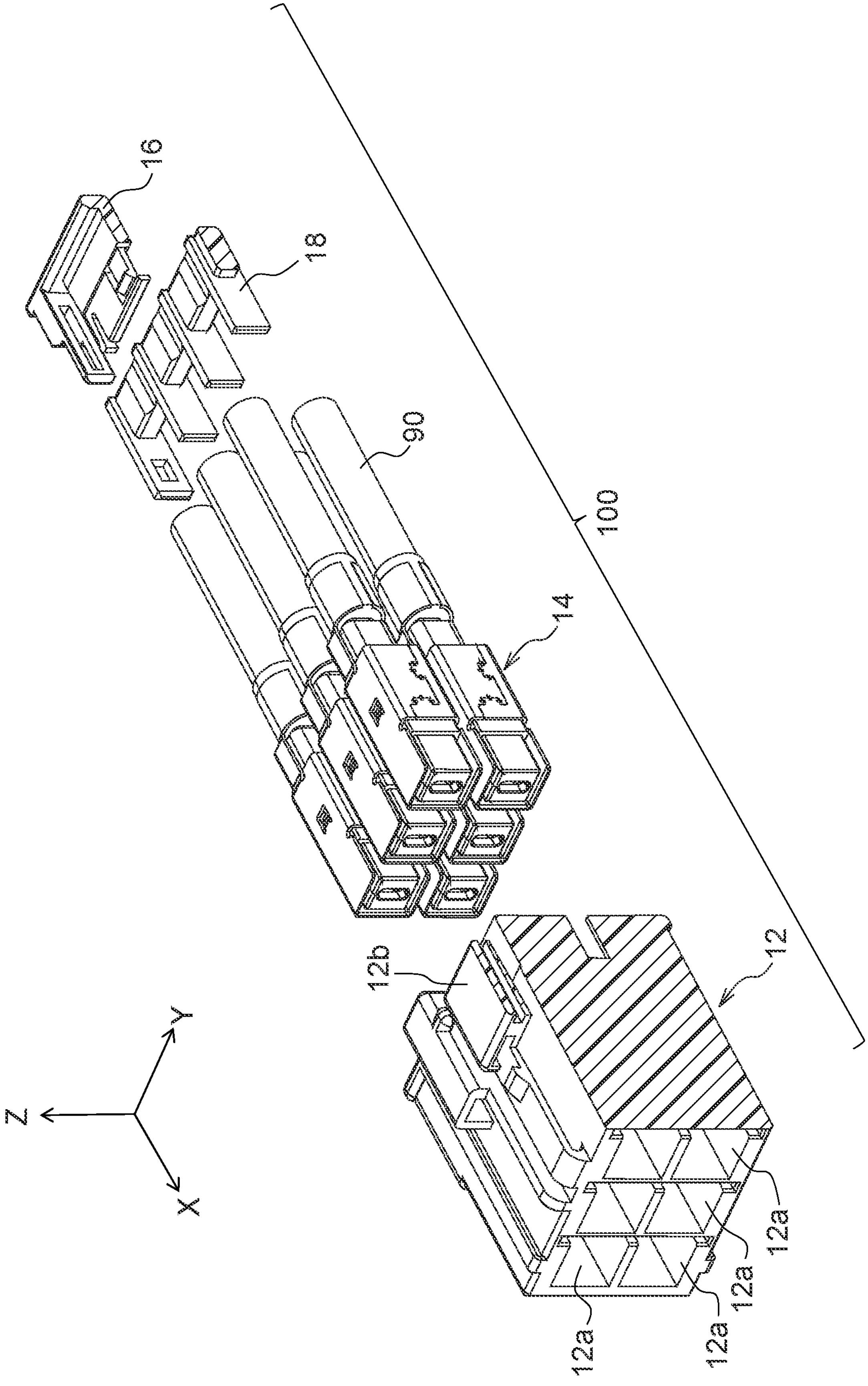
FIG. 2 is an exploded perspective view (cross-section) illustrating a connector of an exemplary embodiment.

FIG. 1 and FIG. 2 illustrate the connector 100 together with plural shield cables 90. Note that in these drawings, for simplicity cross-sections are illustrated in a state in which the connector 100 has been sectioned along a plane perpendicular to a width direction at a width direction central position of the connector 100.

Note that in these drawings an arrow X indicates a connector front direction, an arrow Y indicates a connector width direction one side, and an arrow Z indicates a connector upward direction.

The connector 100 includes a substantially cuboidal shaped housing 12, and plural terminal units 14 housed in the housing 12.

The housing 12 includes plural terminal unit housing portions 12*a*. The terminal units 14 are housed in the terminal unit housing portions 12*a*. The terminal unit housing portions 12*a* pierce through the housing 12 in the X direction (a connector front-rear direction).

The plural terminal unit housing portions 12*a* are configured from plural terminal unit housing portions 12*a* at positions in an upper section of the housing 12, and plural terminal unit housing portions 12*a* at positions in an lower section of the housing 12.

The terminal unit housing portions 12*a* are configured so as to enable the terminal units 14 to be inserted therein from a minus X direction (connector rear direction). The terminal unit housing portions 12*a* are also configured such that the terminal units 14 that have been inserted inside the terminal unit housing portions 12*a* are not able to be pulled out in a plus X direction.

The housing 12 includes a resilient anchor portion 12*b* for maintaining a connected state between the connector 100 and a counterpart side connector (connection target, not illustrated in the drawings). The resilient anchor portion 12*b* includes an operation portion 12*b*1 and a claw portion 12*b*2. The claw portion 12*b*2 is displaced by pressing the operation portion 12*b*1, so as to enable connection between the connector 100 and the counterpart side connector to be released. The resilient anchor portion 12*b* is formed to the upper section of the housing 12.

The connector 100 includes an anchor portion fixing member 16. The anchor portion fixing member 16 prevents flexing of the resilient anchor portion 12*b* in a state in which the anchor portion fixing member 16 is mounted to the housing 12. Release of the connected state between the connector 100 and the counterpart connector is prevented as a result thereof.

The connector 100 includes a stopper member 18. In a mounted state of the stopper member 18, the terminal units 14 are prevented from being pulled out from the terminal unit housing portions 12*a* in the minus X direction (connector rear direction).

Terminal Unit 14

Figure 3:
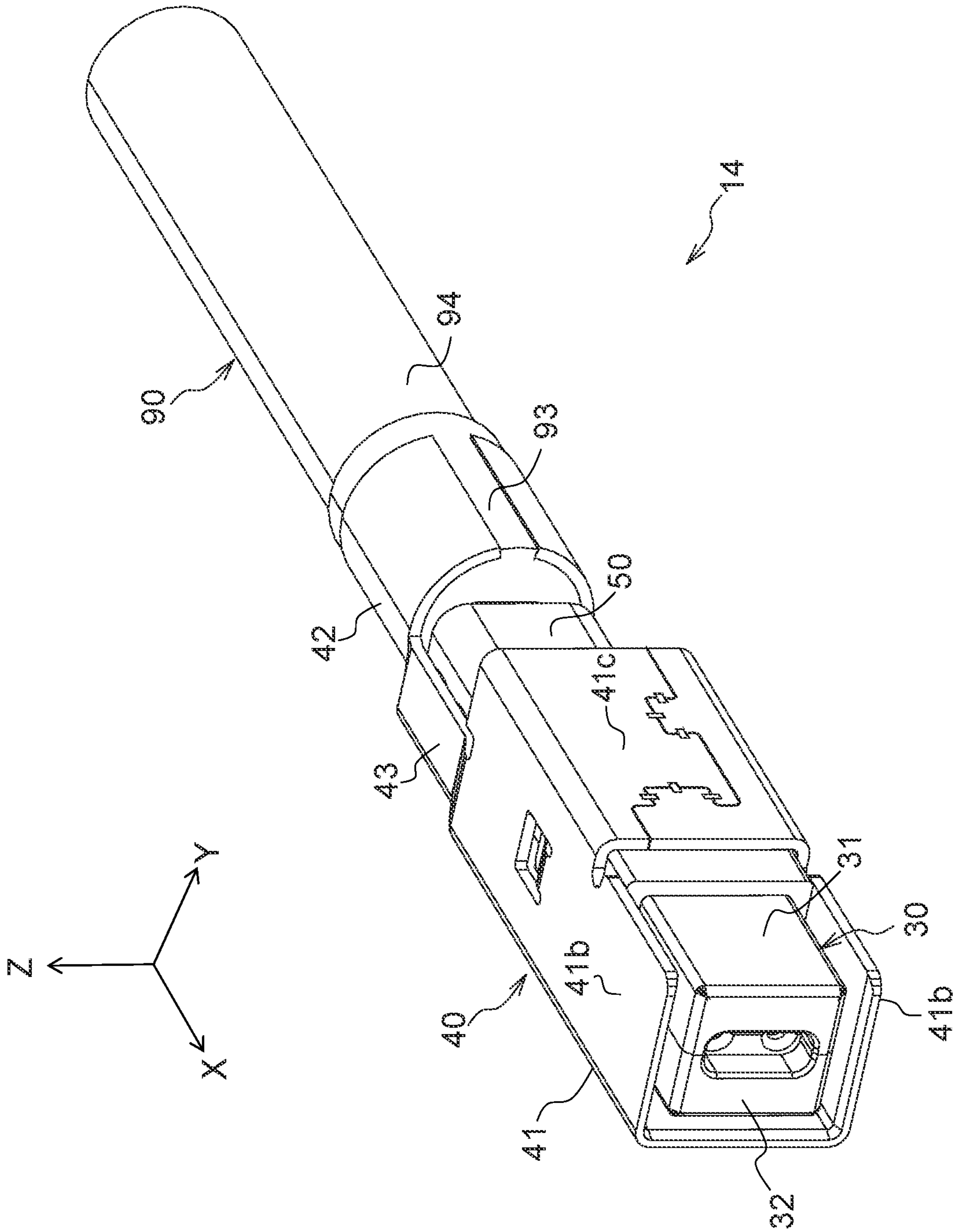
FIG. 3 is a perspective view illustrating a terminal unit of an exemplary embodiment.
Figure 4:
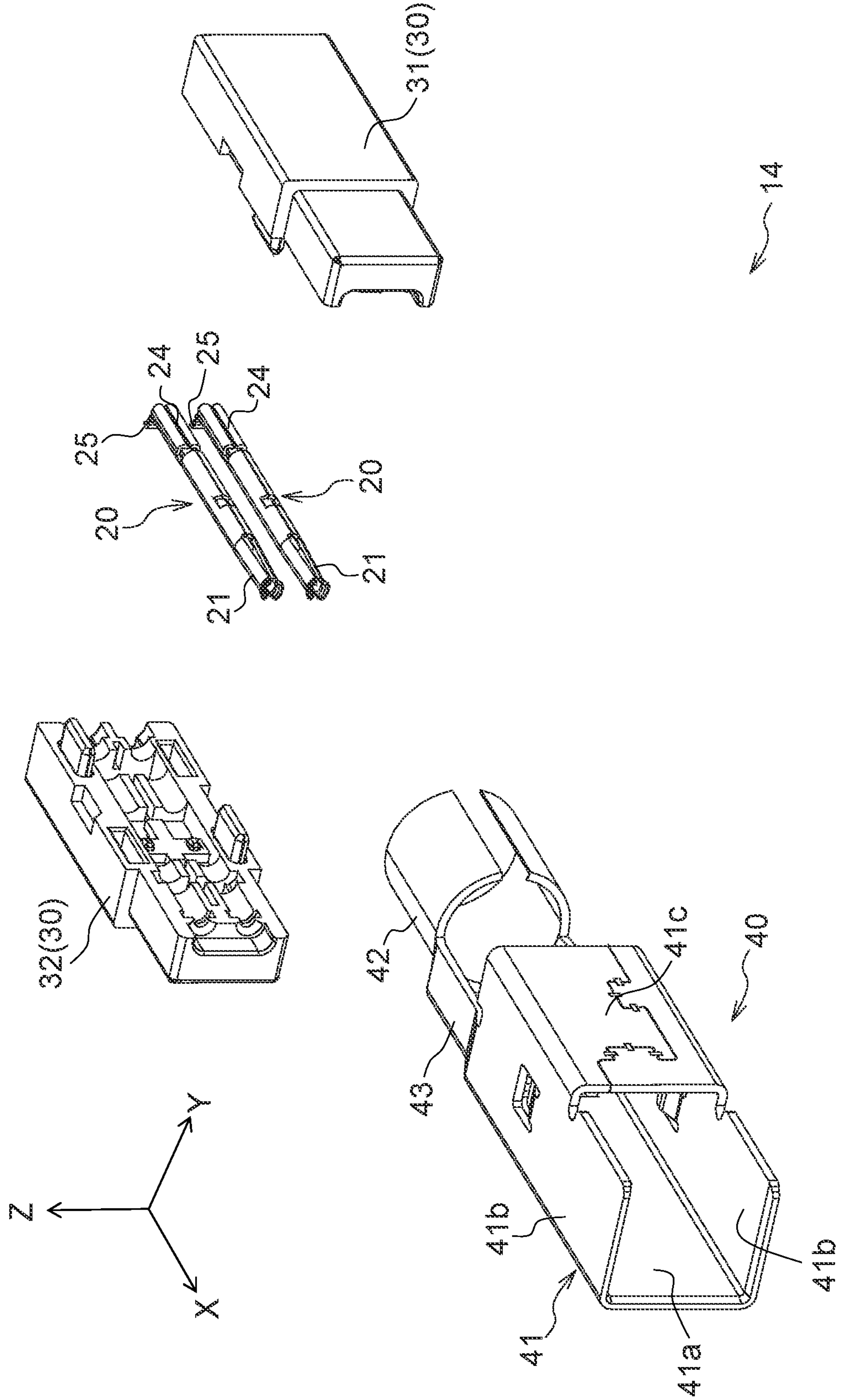
FIG. 4 is an exploded perspective view illustrating a terminal unit of an exemplary embodiment.

Next, description follows regarding the terminal units 14, with reference to FIG. 3 and FIG. 4.

Note that in these drawings an arrow X indicates a unit front direction (axial direction one side), an arrow Y indicates a unit upward direction, and an arrow Z indicates a unit width direction one side. Namely, each of the terminal units 14 is disposed in an orientation in which its width direction one-side faces in the connector upward direction.

As illustrated in FIG. 4, the terminal unit 14 includes two internal terminals 20, a dielectric member 30, and an external terminal 40.

Internal Terminal 20

Figure 5:
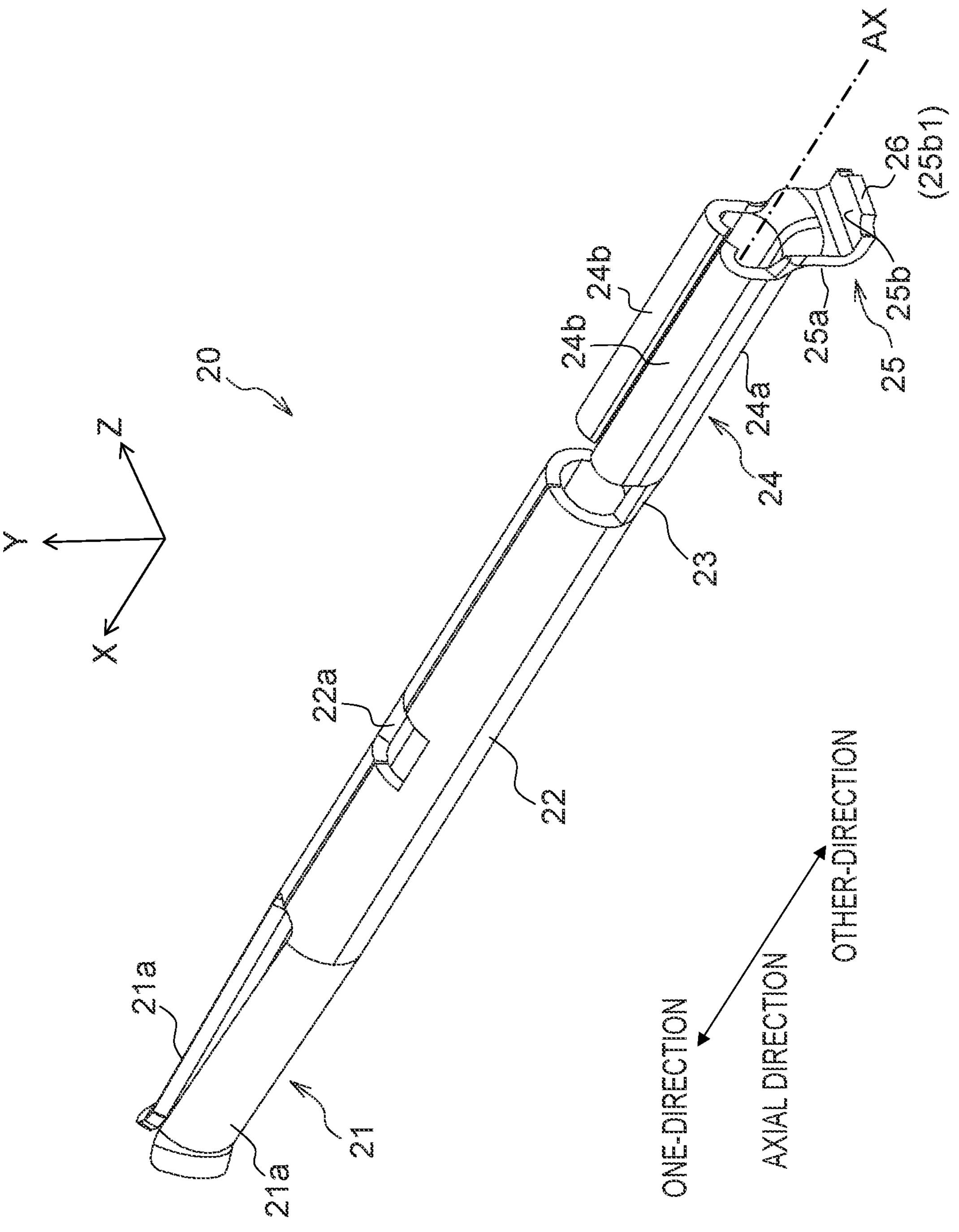
FIG. 5 is a perspective view illustrating an internal terminal of an exemplary embodiment.

FIG. 5 illustrates an enlargement of one of the internal terminals 20.

The internal terminals 20 are members for connecting to the inner conductors 91 of the shield cable 90. The internal terminals 20 are manufactured such as by bending a metal plate material into a tube shape. The internal terminals 20 have substantially symmetrical structures along the unit width direction (Z direction).

Reference in the following description to a radial direction means a direction perpendicular to a virtual center axis AX parallel to a unit axial direction and passing through a center of the internal terminal 20. Radial direction outside means a direction going away from the center axis AX from out of the radial directions.

The internal terminals 20 each include a contact portion 21, a tube portion 22, a coupling portion 23, a press-fit portion 24, and an impedance adjustment section 25, in this order from an axial direction one side toward the axial direction other side.

The contact portion 21 is a portion that contacts a signal terminal (not illustrated in the drawings) of the counterpart side connector. The contact portion 21 includes a pair of contact tabs 21*a*. The pair of contact tabs 21*a* contact a connection target (a signal terminal of the counterpart side connector) so as to sandwich the signal terminal from the unit width directions.

The tube portion 22 is a portion formed in a tube shape by bending a plate material. The tube portion 22 has a circular shaped cross-section orthogonal to the axial direction. End portions of the plate material are in an abutted state against each other at a position on a unit upper side (plus Y direction side) of the tube portion 22.

Anchor holes 22*a* are formed in the tube portion 22. Relative movement in the axial direction of the internal terminal 20 with respect to the dielectric member 30 is restricted by anchor protrusions 36 (see FIG. 7) of the dielectric member 30 being inserted into the anchor holes 22*a*. The anchor holes 22*a* are formed at two locations, on an upper face side (plus Y direction side) and lower face side (minus Y direction side, see FIG. 7) of the tube portion 22.

The coupling portion 23 is a portion that couples the tube portion 22 and the press-fit portion 24 together. More specifically, the coupling portion 23 couples a portion on a lower face side (minus Y direction side) of the tube portion 22 to a bottom plate portion 24*a* of the press-fit portion 24 in the axial direction. A cross-section profile (cross-section profile orthogonal to the axial direction) of the coupling portion 23 is a substantially circular arc shape.

The press-fit portion 24 is a portion for press-fitting onto the inner conductor 91.

The press-fit portion 24 includes the bottom plate portion 24*a* and a pair of press-fit tabs 24*b*. In a state in which the inner conductor 91 of the shield cable 90 is disposed at an inner face side of the bottom plate portion 24*a*, the pair of press-fit tabs 24*b* are deformed and press contacted against the inner conductor 91 at a vicinity of end portions of the press-fit tabs 24*b*. The press-fit portion 24 is thereby press-fitted onto the inner conductor 91, and the inner conductor 91 and the internal terminal 20 are connected together electrically.

The press-fit portion 24 includes a cross-section structure that is substantially uniform along the axial direction.

The impedance adjustment section 25 is a portion connected to the press-fit portion 24. A capacitance of the press-fit portion 24 is increased and the impedance of the press-fit portion 24 is lowered by providing the impedance adjustment section 25.

The impedance adjustment section 25 extends from an axial direction other side end portion of the bottom plate portion 24*a* of the press-fit portion 24. The impedance adjustment section 25 includes a radial direction extension portion 25*a* and an axial direction extension portion 25*b*.

The radial direction extension portion 25*a* is a portion connected to the bottom plate portion 24*a* of the press-fit portion 24 through a bent portion, and is a portion that extends toward the radial direction outside.

More specifically, the radial direction extension portion 25*a* has a plate thickness direction facing in the X direction (unit axial direction). The radial direction extension portion 25*a* has a width direction facing in the Z direction (unit width direction), and extends toward the radial direction outside (more specifically, unit lower side, minus Y direction). A width dimension of the radial direction extension portion 25*a* (unit width direction dimension) is preferably not less than 50% of the width dimension of the press-fit portion 24, and is more preferably not less than 80% thereof. The width dimension of the press-fit portion 24 referred to here means the width dimension in a state in which the press-fit portion 24 is press-fitted onto the inner conductor 91.

The axial direction extension portion 25*b* is a portion connected to the radial direction extension portion 25*a* through a bent portion, and is a portion extending toward the axial direction other side (minus X direction).

More specifically, the axial direction extension portion 25*b* has a plate thickness direction facing in the unit up-down direction (Y direction). The axial direction extension portion 25*b* has a width direction facing in the unit width direction (Z direction), and extends toward the axial direction other side (minus X direction). The width dimension of the axial direction extension portion 25*b* is preferably not less than 50% of the width dimension of the press-fit portion 24, and is more preferably not less than 80% thereof. In the present exemplary embodiment, the width dimension of the axial direction extension portion 25*b* is substantially the same as the width dimension of the radial direction extension portion 25*a*.

Figure 7:
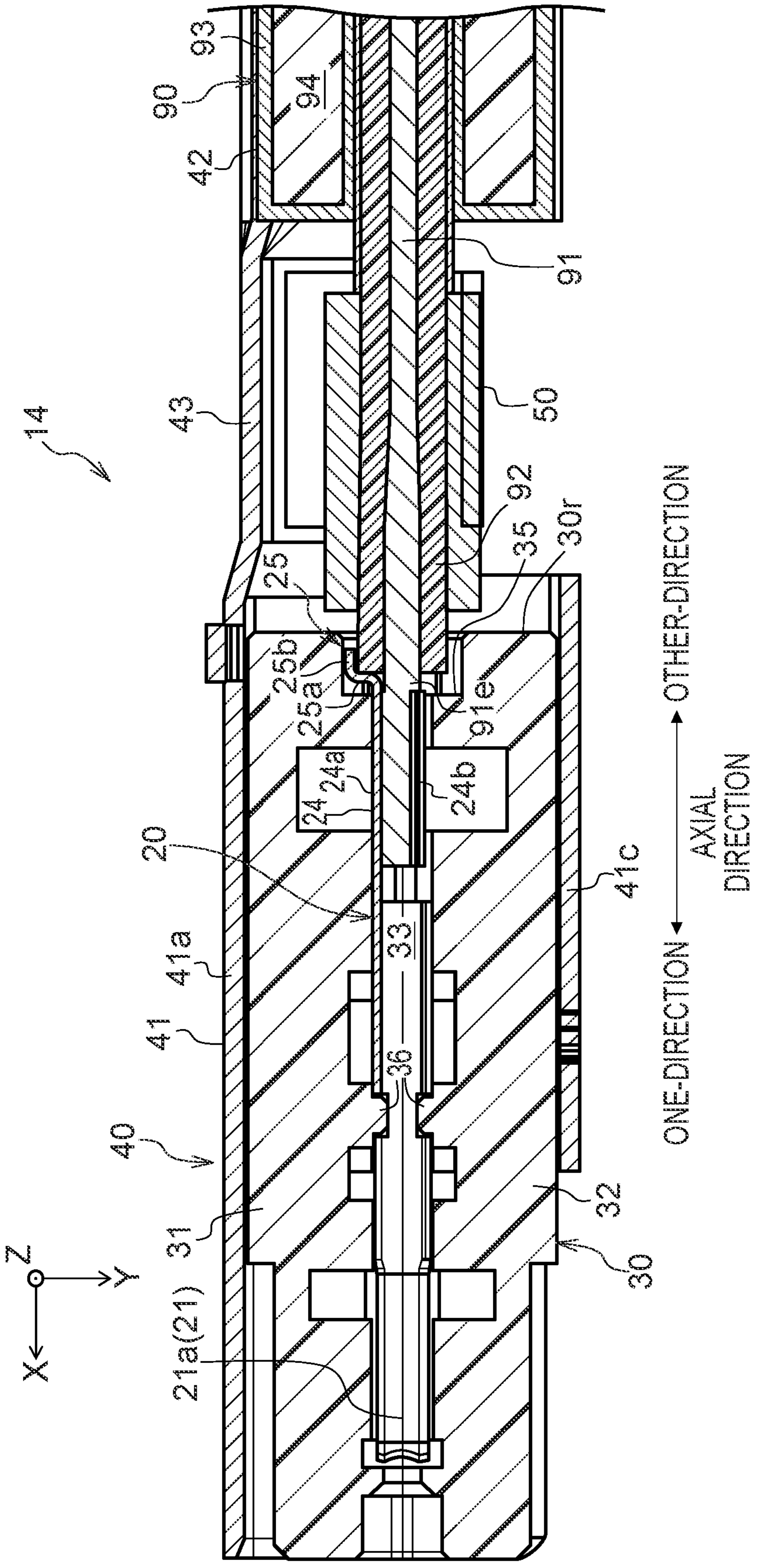
FIG. 7 is a cross-section of a terminal unit (a cross-section perpendicular to a unit width direction)

The axial direction extension portion 25*b* is disposed so as to be alongside a vicinity of an outer face of an insulating cover 92 of the shield cable 90. As illustrated in FIG. 7, in a state in which the internal terminal 20 is mounted to the shield cable 90, a gap between the axial direction extension portion 25*b* and the insulating cover 92 (a gap in the unit up-down direction in the present exemplary embodiment) is preferably smaller than a plate thickness of the axial direction extension portion 25*b*. Moreover, in a state in which the internal terminal 20 is mounted to the shield cable 90, the insulating cover 92 is preferably in a state of contact with or of close proximity to the radial direction extension portion 25*a* of the impedance adjustment section 25.

The other end portion 25*b*1 of the axial direction extension portion 25*b* is a carrier severance portion 26. The carrier severance portion 26 is a portion that is finally severed from a carrier when the internal terminal 20 is manufactured using a progressive manufacturing process.

Dielectric Member 30

The dielectric member 30 is a member that retains the two internal terminals 20.

As illustrated in FIG. 4, the dielectric member 30 includes an upper member 31 and a lower member 32. The dielectric member 30 is configured by combining the upper member 31 and the lower member 32 in the unit up-down direction (Y direction).

Figure 6:
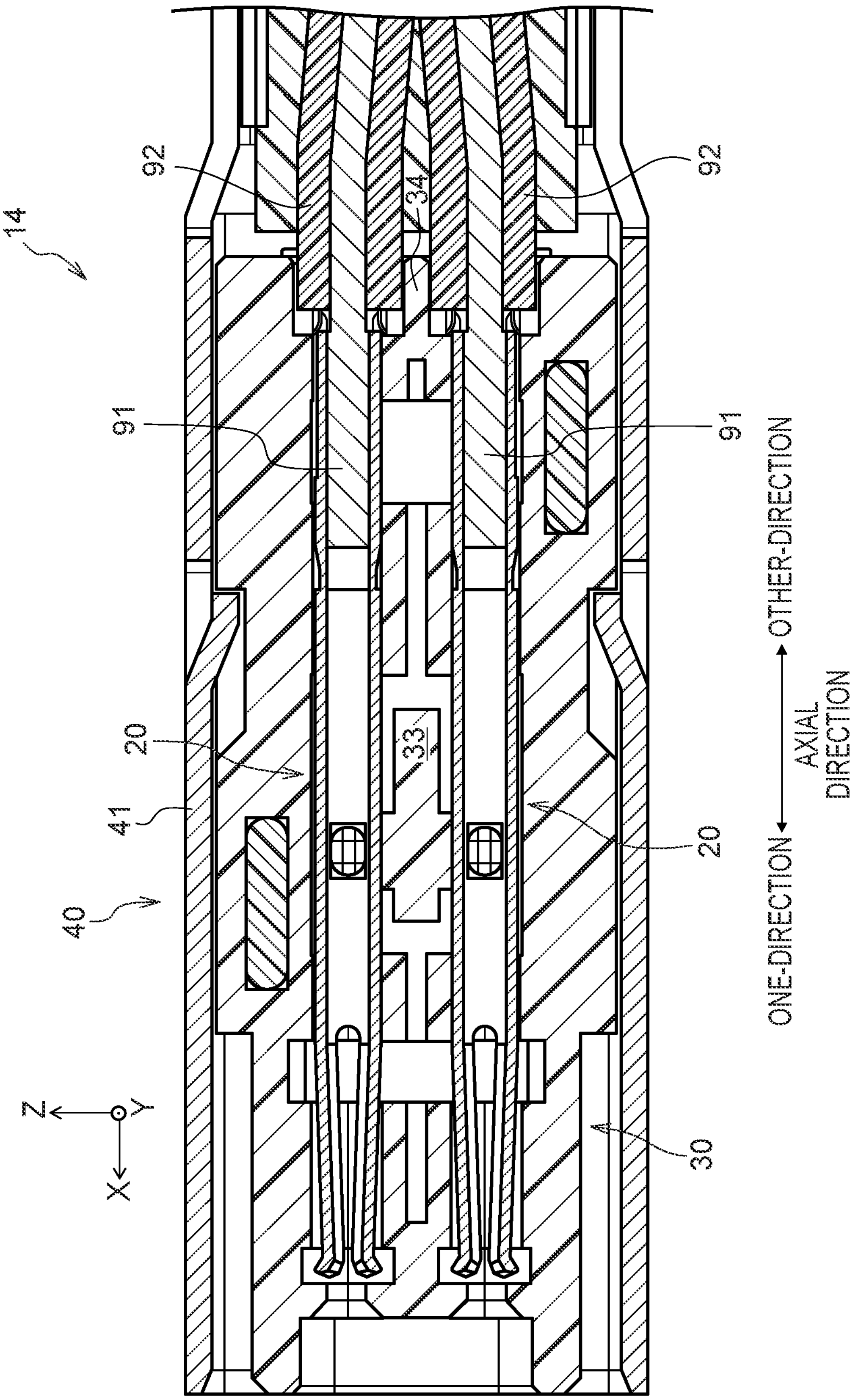
FIG. 6 is a cross-section of a terminal unit (a cross-section perpendicular to a unit up-down direction)

As illustrated in FIG. 6 and FIG. 7, a housing space 33 for housing the internal terminals 20 is formed inside the dielectric member 30. The cross-section profile of the housing space 33 changes depending on position in the axial direction.

The cross-section profile of the housing space 33 at a position corresponding to the axial direction other side end portion of the press-fit portion 24 (a portion adjoining the impedance adjustment section 25) is a profile conforming to an external profile of the press-fit portion 24 (more specifically is a circular shape). The axial direction other side end portion of the press-fit portion 24 of the internal terminal 20 is thereby configured so as not to be misplaced in radial direction position with respect to the dielectric member 30. Namely, the housing space 33 of one of the internal terminals 20 and the housing space 33 of the other internal terminal 20 are separated at this position, and a partition wall 34 (see FIG. 6) is interposed between the one internal terminal 20 and the other internal terminal 20.

Note that the size of the cross-section of the press-fit portion 24 readily varies in a state press-fitted onto the inner conductor 91. Thus the housing space 33 is formed with ample allowance for such conceivably occurring variation so as to enable housing at the position corresponding to the axial direction other side end portion of the press-fit portion 24.

However, as a result thereof, a certain level of gap appears between the press-fit portion 24 and the dielectric member 30, and so the impedance of the press-fit portion 24, or of an exposed portion 91*e* of the inner conductor 91, is not able to be sufficiently lowered using the dielectric member 30 alone.

The cross-section profile of the housing space 33 at a position corresponding to further toward the axial direction one side than the axial direction other side end portion of the press-fit portion 24 is enlarged in the unit up-down direction (Y direction) compared to the position corresponding to the axial direction other side end portion of the press-fit portion 24 (the portion adjoining the impedance adjustment section 25) (see FIG. 7). The housing space 33 of the one internal terminal 20 and the housing space 33 of the other internal terminal 20 are coupled together (see FIG. 6).

The cross-section profile of the housing space 33 at the position corresponding to the impedance adjustment section

25 is enlarged in the radial direction compared to at the position corresponding to the axial direction other side end portion of the press-fit portion 24 (the portion adjoining the impedance adjustment section 25). This thereby enables a size to be achieved that enables placement of the impedance adjustment section 25 and part (an axial direction one side end portion) of the insulating cover 92. Looking at it another way, as illustrated in FIG. 7, this could be described as there being an indentation 35 having a depth direction toward the axial direction one side being provided to a rear face 30*r* of the dielectric member 30, with the indentation 35 being formed for placement of the impedance adjustment section 25 and part of (the axial direction one side portion) of the insulating cover 92 therein. The impedance adjustment section 25 is thereby not in a state projecting toward the axial direction other side from the dielectric member 30 and is in a state surrounded by the dielectric member 30. At this position the housing space 33 of the one internal terminal 20 and the housing space 33 of the other internal terminal 20 are separated, with the partition wall 34 interposed between the one internal terminal 20 and the other internal terminal 20.

The dielectric member 30 includes the anchor protrusions 36. The anchor protrusions 36 are formed respectively to the upper member 31 and the lower member 32. The anchor protrusions 36 are disposed in the anchor holes 22*a* of the internal terminals 20.

External Terminal 40

The external terminal 40 is a member for connecting to an external conductor 93 and houses the dielectric member 30.

The external terminal 40 is manufactured by fold-bending a metal plate material or the like.

As illustrated in FIG. 4, the external terminal 40 includes a main body 41, an external conductor connection portion 42, and a coupling portion 43.

The main body 41 includes a first plate portion 41*a*, and a pair of second plate portions 41*b*.

The first plate portion 41*a* has a rectangular flat plate shape with a plate thickness direction facing in the unit up-down direction (Y direction). Each of the pair of second plate portions 41*b* has a rectangular flat plate shape with a plate thickness direction facing in the unit width direction (Z direction). The pair of second plate portions 41*b* are connected to the first plate portion 41*a* through bent portions.

The main body 41 includes a third plate portion 41*c*. The third plate portion 41*c* couples upper ends (plus Y direction ends) of the pair of second plate portions 41*b* together in the unit width direction. The third plate portion 41*c* has a rectangular flat plate shape with a plate thickness direction facing in the unit up-down direction (Y direction). The third plate portion 41*c* is formed by combining a pair of plate portions extending from the pair of the second plate portions 41*b*. An end at the axial direction one side of the third plate portion 41*c* is formed further toward the axial direction other side than axial direction one side ends of the first plate portion 41*a* and the pair of second plate portions 41*b*.

Figure 8:
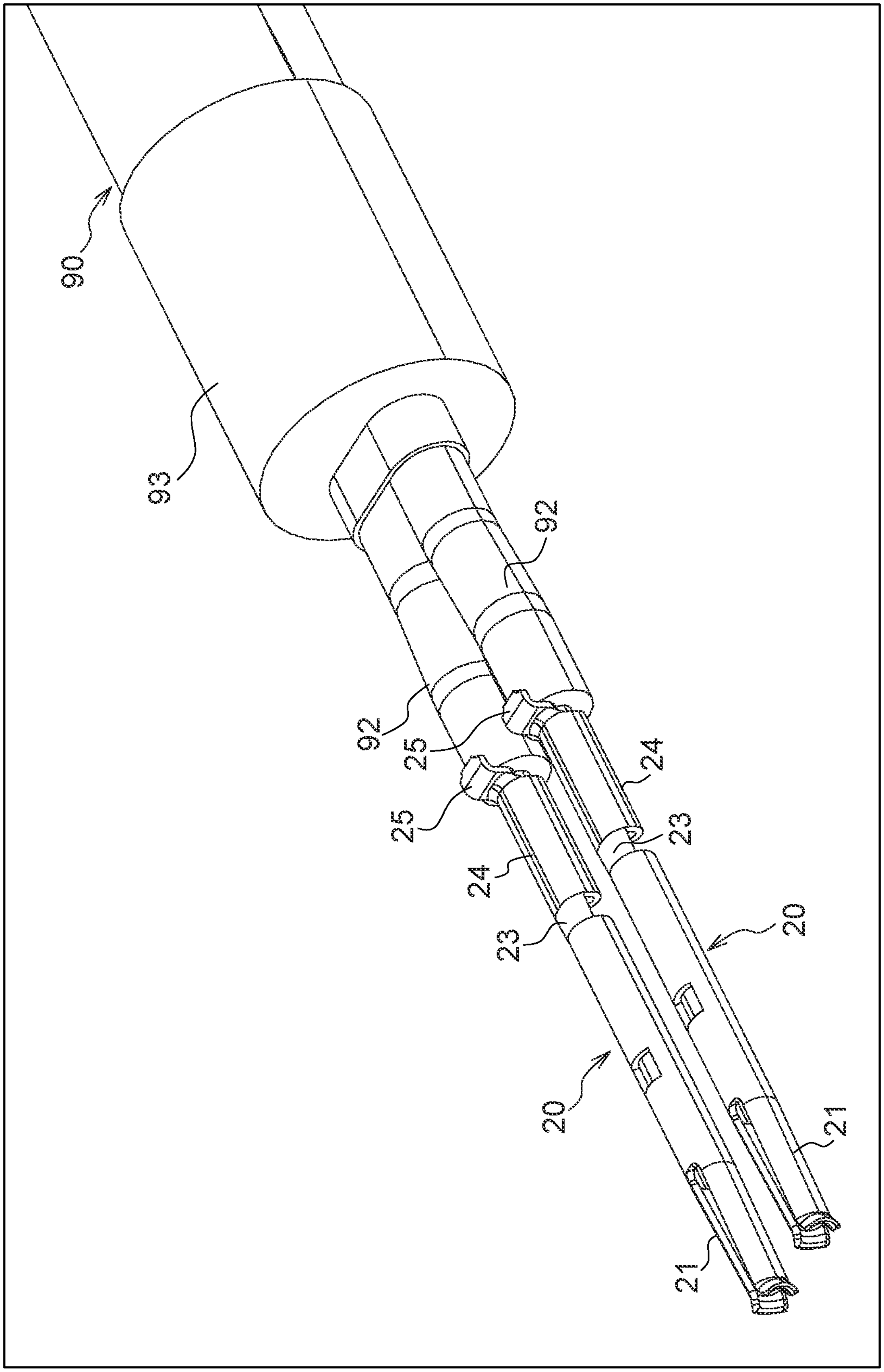
FIG. 8 is a perspective view of a terminal unit and illustrates a state mounted to a shield cable with an external terminal and a dielectric member omitted.

The external conductor connection portion 42 is a portion for connecting to the external conductor 93 of the shield cable 90. Note that, as illustrated in FIG. 7 and FIG. 8, the external conductor 93 of the shield cable 90 is folded back at a vicinity of an extreme end of the shield cable 90 and overlaps at an outside of an outside covering 94, with the external conductor connection portion 42 being connected at the folded back portion.

The coupling portion 43 is a portion coupling the main body 41 and the external conductor connection portion 42 together in the X direction. A cross-section profile of the coupling portion 43 is a substantially U-shape open toward the plus Y direction.

Note that the terminal units 14 each include an additional shield member 50 (see FIG. 3 and FIG. 7). The additional shield member 50 is a member extending in the X direction, and has a substantially U-shaped cross-section profile open in the minus Y direction. The two inner conductors 91 (and the two insulating covers 92) of the shield cable 90 are collectively surrounded in a circumferential direction by a combination of the coupling portion 43 and the additional shield member 50.

Operation and Advantageous Effects Next, description follows regarding operation and advantageous effects of the present exemplary embodiment.

In the present exemplary embodiment, as illustrated in FIG. 3, the terminal unit 14 is mounted to the shield cable 90. As illustrated in FIG. 6 to FIG. 8, the shield cable 90 includes two of the inner conductors 91, and the external conductor 93 for shielding the two inner conductors 91.

As illustrated in FIG. 4, the terminal unit 14 includes one or more of the internal terminals 20 for connecting to the one or more inner conductors 91, the dielectric member 30 retaining the one or more internal terminals 20, and the external terminal 40 for connecting to the external conductor 93. The external terminal 40 houses the dielectric member 30.

As illustrated in FIG. 5, the internal terminals 20 each include the contact portion 21 for contacting to the connection target (signal terminal of the counterpart side connector), and the press-fit portion 24 for press-fitting onto the inner conductor 91. The contact portion 21 is provided at the axial direction one side, and the press-fit portion 24 is provided at the axial direction other side.

The internal terminals 20 each further include the impedance adjustment section 25 connected to the press-fit portion 24. The capacitance of the press-fit portion 24 is accordingly increased, enabling the impedance of the press-fit portion 24 to be lowered.

Furthermore, the impedance adjustment section 25 projects toward the axial direction other side with respect to the press-fit portion 24. This accordingly enables the impedance at the portion 91*e* exposed from the insulating cover 92 (sometimes referred to below as inner conductor exposed portion 91*e*, see FIG. 7 and FIG. 9) to be prevented from rising excessively at a portion of the inner conductors 91 of the shield cable 90 further to the axial direction other side than a position where the press-fit portion 24 is press-fitted.

Figure 9:
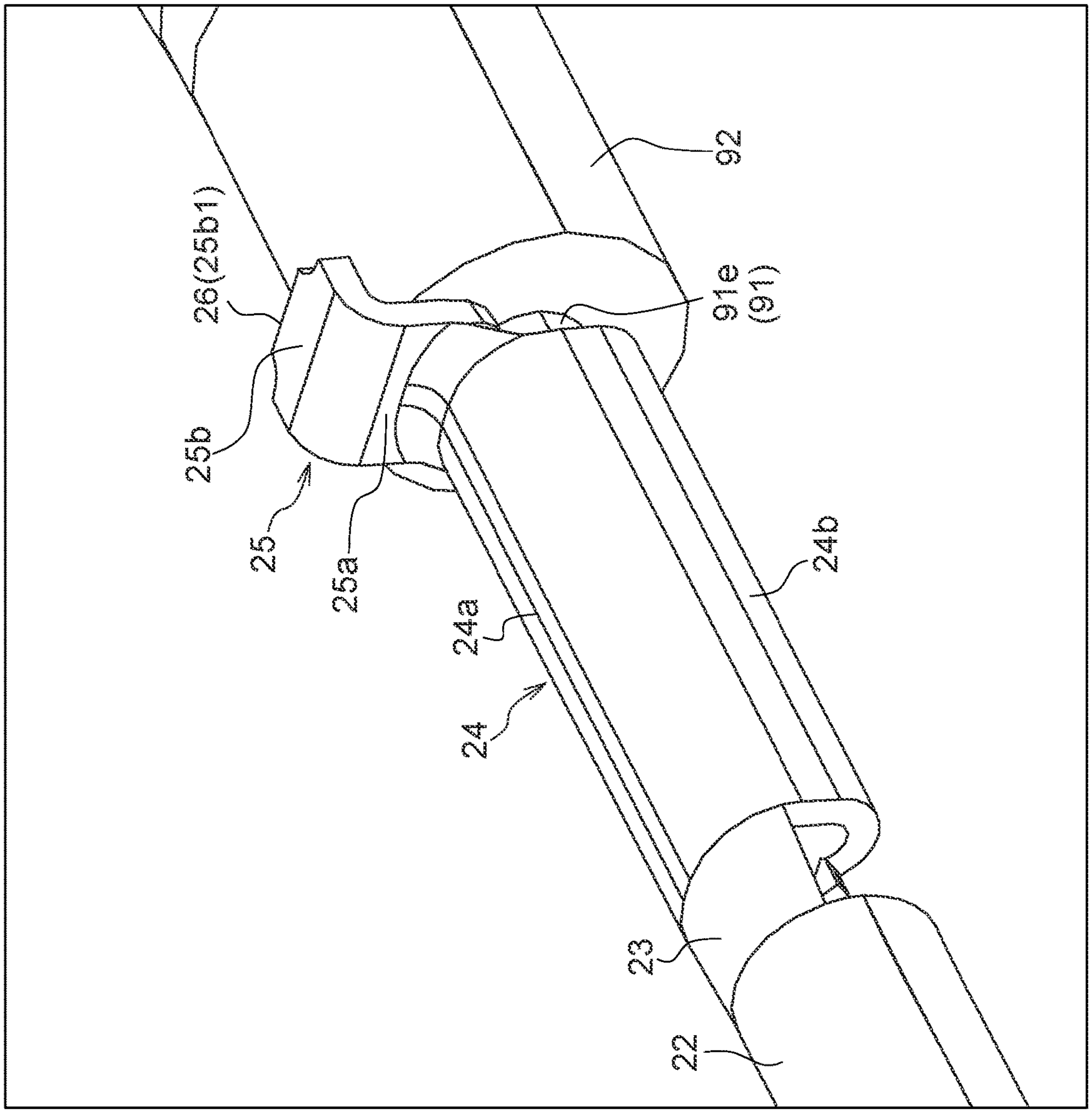
FIG. 9 is an enlarged perspective view of an internal terminal connected to a shield cable in a vicinity of an impedance adjustment section.

Moreover as illustrated in FIG. 9, in the present exemplary embodiment the impedance adjustment section 25 includes an axial direction extension portion 25*b* extending in the axial direction. Note that although in the present exemplary embodiment the radial direction extension portion 25*a* is formed between the press-fit portion 24 and the axial direction extension portion 25*b*, the radial direction extension portion 25*a* may be omitted. This means that axial direction extension portion 25*b* can be disposed so as to be along the inner conductor 91 or along the insulating cover 92 covering the inner conductor 91. The length of the impedance adjustment section 25 can be secured as a result thereof, enabling impedance matching to be enhanced even more.

Moreover, in the present exemplary embodiment, the impedance adjustment section 25 further includes the radial direction extension portion 25*a* extending in the radial direction. The radial direction extension portion 25*a* is positioned between the press-fit portion 24 and the axial direction extension portion 25*b*. This thereby enables the press-fit portion 24 to be brought into close proximity to the insulating cover 92, and also enables the axial direction extension portion 25*b* to be disposed along the insulating cover 92. As a result the impedance matching can be enhanced even more.

Moreover, in the present exemplary embodiment the impedance adjustment section 25 is formed as a single body together with the press-fit portion 24. This means that manufacture of the internal terminals 20 is easier than an embodiment in which the impedance adjustment section 25 is formed as a separate body from the press-fit portion 24.

Moreover, in the present exemplary embodiment, the impedance adjustment section 25 extends from an axial direction other side end portion of the bottom plate portion 24*a* of the press-fit portion 24. This means that manufacture of the internal terminals 20 is easier than an embodiment in which the impedance adjustment section 25 extends from a portion other than an axial direction other side end portion of the bottom plate portion 24*a*.

Moreover, in the present exemplary embodiment, as illustrated in FIG. 9, the impedance adjustment section 25 is not a structure that surrounds the inner conductor 91 in the circumferential direction. This enables the impedance to be prevented from dropping excessively compared to an embodiment in which the impedance adjustment section 25 is a structure that surrounds the inner conductor 91 in the circumferential direction.

Moreover, in the present exemplary embodiment, the terminal unit 14 includes the two internal terminals 20. Neither of the impedance adjustment sections 25 provided to the two respective internal terminals 20 is disposed between the two inner conductors 91 (see FIG. 6).

Were one of the impedance adjustment sections 25 provided to the two respective internal terminals 20 to be disposed between the two inner conductors 91 then there might have been a concern regarding an adverse effect on impedance matching, however, the present exemplary embodiment is able to prevent this from occurring.

In the present exemplary embodiment, the dielectric member 30 includes the partition wall 34 (see FIG. 6) positioned between the impedance adjustment sections 25 provided to the two internal terminals 20. This thereby enables the impedance to be lowered compared to an embodiment not including such a partition wall 34.

Moreover as illustrated in FIG. 5, in the present exemplary embodiment the end portion 25*b*1 on the opposite side of the impedance adjustment section 25 to the side connected to the press-fit portion 24 is configured by the carrier severance portion 26. This enables the internal terminals 20 including the impedance adjustment sections 25 to be manufactured by adjusting a position where the internal terminals 20 are severed from the carrier in the manufacturing processes thereof. This results in easy manufacture of the internal terminals 20.

Moreover as illustrated in FIG. 6 and FIG. 7, in the present exemplary embodiment the dielectric member 30 surrounds the impedance adjustment sections 25 in a circumferential direction. The impedance of the exposed portions 91*e* of the inner conductors 91 can accordingly be lowered compared to an embodiment in which the dielectric member 30 does not surround the impedance adjustment sections 25 in the circumferential direction.

In the present exemplary embodiment, as illustrated in FIG. 1 and FIG. 2, the connector 100 includes plural terminal units 14, and a housing 12 that retains the plural terminal units 14. The terminal units 14 have enhanced impedance matching, enabling the connector 100 having enhanced impedance matching to be obtained.

Supplementary Explanation to Above Exemplary Embodiment

Note that in the above exemplary embodiment an example is described in which the terminal units 14 each include two internal terminals 20. However, the terminal unit of the present disclosure is not limited thereto, and may include a single internal terminal, or may include three or more internal terminals.

Note that in the above exemplary embodiment an example is described in which the dielectric member 30 is configured from the upper member 31 and the lower member 32 formed as separate bodies to each other. However, the dielectric member of the present disclosure is not limited thereto, and may be formed overall as a single body.

Moreover, in the above exemplary embodiment an example is described in which the terminal unit 14 configures part of the connector 100 housed in the housing 12. However, the terminal unit of the present disclosure is not limited thereto.

EXPLANATION OF THE REFERENCE NUMERALS

100 connector
12 housing
14 terminal unit
20 internal terminal
21 contact portion
24 press-fit portion
24*a* bottom plate portion
24*b* press-fit tab
25 impedance adjustment section
25*a* radial direction extension portion
25*b* axial direction extension portion
25*b*1 other end portion
26 carrier severance portion
30 dielectric member
34 partition wall
35 indentation
40 external terminal
90 shield cable
91 inner conductor
91*e* exposed portion
92 insulating cover
93 external conductor
AX center axis

The invention claimed is:

1. A terminal unit for mounting to a shield cable including one or more inner conductor and an external conductor that shields the one or more inner conductor, the terminal unit comprising:

one or more internal terminal for connecting to the one or more inner conductor;

a dielectric member that retains the one or more internal terminal; and an external terminal for connecting to the external conductor and that houses the dielectric member, wherein:

the one or more internal terminal includes an internal terminal that does not include a portion configured to be crimped to an insulating cover of the shield cable, the internal terminal including:

a contact portion provided at an axial direction one side for contacting a connection target;

a press-fit portion provided at the axial direction other side for press-fitting together with the inner conductor; and an impedance adjustment section that is connected to the press-fit portion, with the impedance adjustment section projecting out to the axial direction other side with respect to the press-fit portion, the impedance adjustment section not being a structure surrounding the inner conductor in a circumferential direction.

2. The terminal unit of claim 1, wherein the impedance adjustment section includes an axial direction extension portion that extends in an axial direction.

3. The terminal unit of claim 2, wherein the impedance adjustment section further includes a radial direction extension portion extending in a radial direction, with the radial direction extension portion positioned between the press-fit portion and the axial direction extension portion.

4. The terminal unit of claim 2, wherein the axial direction extension portion is disposed so as to be alongside a vicinity of an outer surface of the insulating cover of the shield cable, and a gap in a radial direction is formed between the axial direction extension portion and the insulating cover.

5. The terminal unit of claim 1, wherein the impedance adjustment section is formed as a single body together with the press-fit portion.

6. The terminal unit of claim 5, wherein:

the press-fit portion includes a bottom plate portion and a press-fit tab extended from the bottom plate portion; and the impedance adjustment section extends from an end portion at the axial direction other side of the bottom plate portion.

7. The terminal unit of claim 1, wherein:

the one or more inner conductors is two or more inner conductors;

the one or more internal terminal is two or more internal terminals; and the dielectric member includes a partition wall at a position between the impedance adjustment sections for each of adjacent two inner terminals of the two or more inner terminals.

8. The terminal unit of claim 1, wherein the dielectric member surrounds the impedance adjustment section in a circumferential direction.

9. A connector including a plurality of terminal units and a housing that retains the plurality of terminal units, wherein each of the terminal units is the terminal unit of claim 1.

10. A terminal unit for mounting to a shield cable including one or more inner conductor and an external conductor that shields the one or more inner conductor, the terminal unit comprising:

one or more internal terminal for connecting to the one or more inner conductor;

a dielectric member that retains the one or more internal terminal; and an external terminal for connecting to the external conductor and that houses the dielectric member, wherein:

the one or more internal terminal includes an internal terminal including:

a contact portion provided at an axial direction one side for contacting a connection target;

a press-fit portion provided at the axial direction other side for press-fitting together with the inner conductor; and an impedance adjustment section that is connected to the press-fit portion, with the impedance adjustment section projecting out to the axial direction other side with respect to the press-fit portion;

the one or more inner conductor is two or more inner conductors;

the one or more internal terminal is two or more internal terminals; and two or more of the impedance adjustment sections are not disposed between adjacent inner conductors from out of the two or more inner conductors.

11. A terminal unit for mounting to a shield cable including one or more inner conductor and an external conductor that shields the one or more inner conductor, the terminal unit comprising:

one or more internal terminal for connecting to the one or more inner conductor;

a dielectric member that retains the one or more internal terminal; and an external terminal for connecting to the external conductor and that houses the dielectric member, wherein:

the one or more internal terminal includes an internal terminal including:

a contact portion provided at an axial direction one side for contacting a connection target;

a press-fit portion provided at the axial direction other side for press-fitting together with the inner conductor; and an impedance adjustment section that is connected to the press-fit portion, with the impedance adjustment section projecting out to the axial direction other side with respect to the press-fit portion; and an end portion on an opposite side of the impedance adjustment section to where the press-fit portion is connected is a carrier severance portion.

* * * * *